(12) United States Patent
Saba et al.

(10) Patent No.: US 6,726,175 B1
(45) Date of Patent: Apr. 27, 2004

(54) GAS VALVE

(75) Inventors: Taraz' U'Llah Saba, Wellington (NZ); Maria May Brenmuhl, Dunedin (NZ); Simon Denzil Brown, Dunedin (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 17 days.

(21) Appl. No.: 10/129,515

(22) PCT Filed: Nov. 1, 2000

(86) PCT No.: PCT/NZ00/00214

§ 371 (c)(1),
(2), (4) Date: Aug. 13, 2002

(87) PCT Pub. No.: WO01/33118

PCT Pub. Date: May 10, 2001

(30) Foreign Application Priority Data

Nov. 2, 1999 (NZ) .................................................. 500787
Aug. 17, 2000 (NZ) .................................................. 506399

(51) Int. Cl.[7] .............................. F16K 3/03; F16K 3/32; F16K 5/10; F16K 5/12
(52) U.S. Cl. ........................................ 251/209; 251/205
(58) Field of Search .................................... 251/205–209

(56) References Cited

U.S. PATENT DOCUMENTS

| 4,180,542 A | 12/1979 | Wrasman |
| 4,380,250 A | 4/1983 | Stoll |
| 4,842,245 A | 6/1989 | Kelsey |
| 4,848,405 A | 7/1989 | Albrecht |
| 4,946,134 A | 8/1990 | Orlandi |
| 4,947,891 A | * 8/1990 | Genbauffe ............ 251/209 |
| 5,009,393 A | 4/1991 | Massey |
| 5,054,522 A | 10/1991 | Kowanz et al. |
| 5,108,075 A | * 4/1992 | Downard et al. ............ 251/209 |
| 5,277,221 A | * 1/1994 | Amaya ......................... 251/207 |
| 5,434,246 A | 7/1995 | Fukuda et al. |
| 5,580,029 A | 12/1996 | Bjerggaard |
| 5,799,689 A | 9/1998 | Tang et al. |
| 5,975,135 A | 11/1999 | Aguirre-Esponda et al. |
| 6,035,883 A | 3/2000 | Benjey |

FOREIGN PATENT DOCUMENTS

| AU | 4601279 | 4/1979 |
| DE | 2748734 | 5/1979 |
| DE | 29703788 | 8/1997 |
| DE | 29905865 | 9/1999 |
| EP | 305252 | 8/1988 |
| EP | 678675 | 4/1995 |
| GB | 2029564 | 3/1980 |
| GB | 2059550 | 4/1981 |
| GB | 2101272 | 1/1983 |
| GB | 2219066 | 11/1989 |
| GB | 2267551 | 12/1993 |
| JP | 61276628 | 6/1986 |
| JP | 9210225 | 8/1997 |
| JP | 9303581 | 11/1997 |
| JP | 10103551 | 4/1998 |
| RU | 2097633 | 2/1994 |
| WO | wo8705374 | 9/1987 |

* cited by examiner

Primary Examiner—Paul J. Hirsch
(74) Attorney, Agent, or Firm—Trexler, Bushneel, Giangiorgi, Blackstone & Marr, Ltd

(57) ABSTRACT

A valve (100) for controlling gas flow for a gas heating which allows, as different embodiments, (1) A gradual and smooth transition from high flow to low flow. This is achieved by a rotatable control means (108) wherein the valve body or control means has a taping groove (134) on an annular path intersecting with a port to allow variation in flow rate as the control means rotates. (2) The ganging together into modular form of several valve units with the inlet ports forming a common inlet manifold. (3) The control means, at least, is a plastic, eg nylon. (4) The switching to off from either high or low flow is allowed. But the switching from off to on is directly to high flow. The switching from off to on is prevented from going to low flow directly

19 Claims, 12 Drawing Sheets

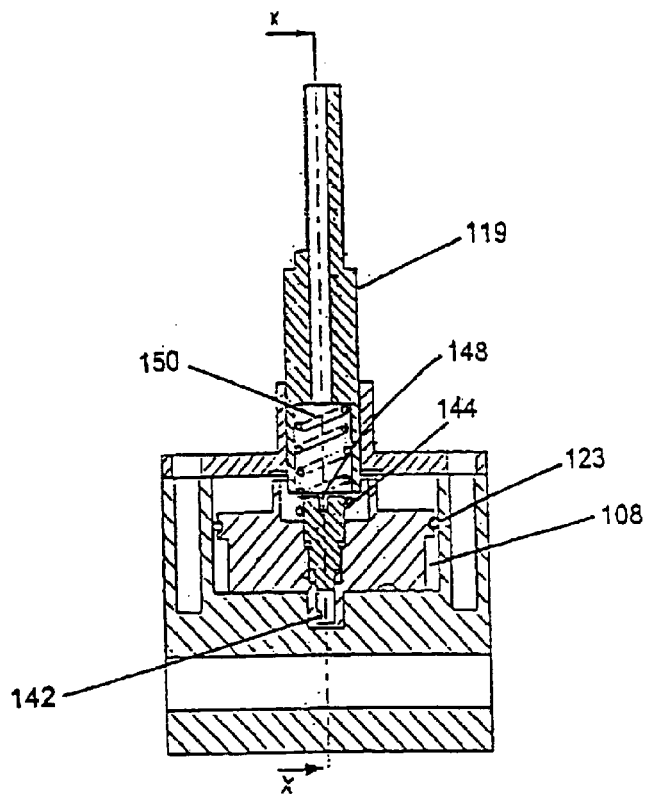
FIG. 4
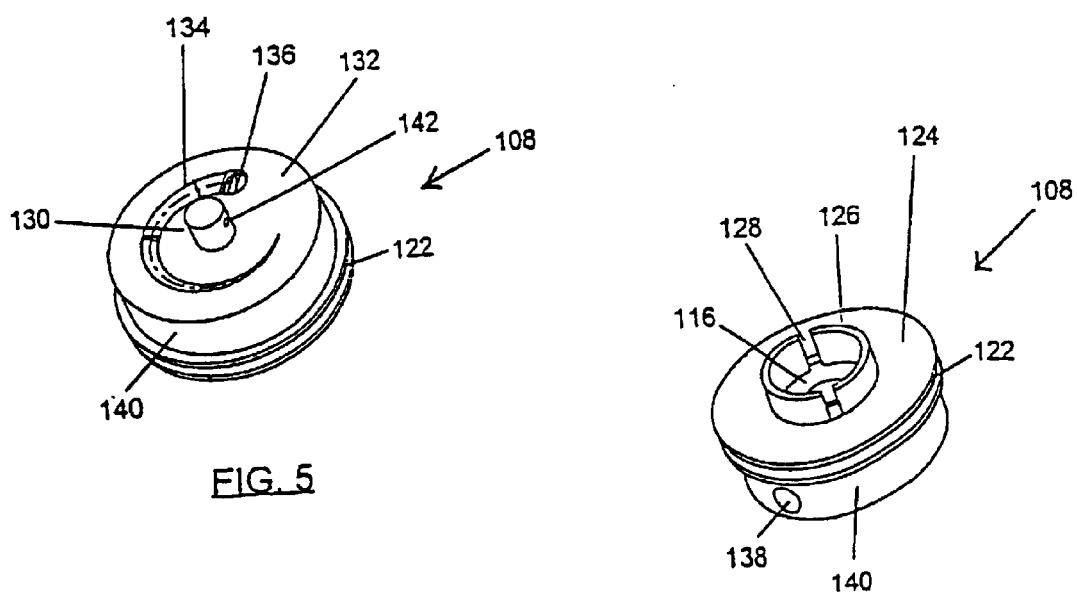
FIG. 5
FIG. 6

GAS VALVE

FIELD OF THE INVENTION

The present invention relates to use of a valve particularly but not solely referring to an improvement in the control over the flow rate of gaseous fuels.

BACKGROUND TO THE INVENTION

It is well known in the art that a simple rotating ball valve may be used to control the flow of gases. However, such prior art devices commonly suffer a lack of control in adjusting the flow rate to anything other than a high setting. For example, consider FIG. 1, with a graph comparing flow rate against control rotation for a typical prior art valve. There is a very abrupt change between the low setting 11 and the high flow rate setting 12, which occurs over a very small angle as is therefore very hard to accurately achieve flow rates in between these settings. This is particularly important in applications such as a gas cook top where, for example, a chef might require very fine control over the heat applied to the cooking vessel in order to achieve a particular style of cuisine. This may require either remarkably dexterous control over the gas valve or intricate mechanical arrangements in order to improve the level of control, especially at low flow rates.

For example, Korean Patent 9208198 issued to Rinhai Co discloses a solenoid valve in order to electronically achieve improved control over the flow rate over a wide range of flow rates, U.S. Pat. No. 5,009,393 issued to Harper-Wyman Co discloses a linear turn down metering valve with improved controllability. This device however is difficult to manufacture and is quite complicated in construction. It would be desirable to have a simpler construction and to use more efficient materials.

It is also well known in gas valves to have the valve going from the high flow setting to the off setting and vice versa in one movement. This is so that when the burner or heater is started the maximum flow rate of gases is supplied to assist the correct ignition of the flame. It would be dangerous to start the flame with a low flow setting as if the gas was not to ignite a build up of gas could occur with a resulting danger of explosion. Accordingly conventional gas valves only allow rotation to the off position in one direction and have a stopper to prevent any rotation between the low flow setting and the off flow setting. However it would be desirable to allow the gas valve to be switched off from a low flow setting but to also ensure that the gas valve could not be switched on to a low flow seeing from the off setting.

SUMMARY OF THE INVENTION

Accordingly it is an object of the present invention to provide an improved gas valve which goes some way to overcoming the above disadvantages, or which will at least, provide the public with a useful choice.

In a first aspect the present invention consists in a valve for controlling a flow of fluid comprising:
 a body portion including a fluid inlet and a fluid outlet through which said flow of fluid pass in use, and
 control means for restricting said flow of fluid between said fluid inlet and said fluid outlet located within said body portion and adjustably rotatable therein,
 wherein one of said body portion or said control means includes a tapering groove on an annular path and the other includes a port intersecting with said annular groove such that the position of said intersection varies according to the angular position of said control means, such tat in use there is a gradual variation in the flow rate of said flow of fluid with respect to variations in the angular position of said control means, over a substantial angle of rotation of said control means, said intersection being within a flow path between said fluid inlet and said fluid outlet.

In a second aspect the present invention consists in a valve for controlling a flow of fluid comprising:
 a body portion including a fluid inlet communicating with at least two outer faces of said valve and a fluid outlet through which said flow of gases pass in use, and
 control means for restricting said flow of fluid between said fluid inlet and said fluid outlet located within said body portion,
 wherein said body portion and said inlet is adapted such that in use when a number of said valves are ganged together their respective said fluid inlets interconnect to form a common fluid inlet.

In a third aspect, the present invention consists in a valve for controlling a flow of fluid comprising a body portion including:
 a fluid inlet and a fluid outlet through which said flow of fluid pass in use, and
 control means for restricting said flow of fluid between said fluid inlet and said fluid outlet located within said body portion and adjustable rotatable therein,
 wherein said control means, at least in a substantial portion, is comprised of a plastics composition.

In a fourth aspect the present invention consists in a valve for controlling a flow of fluid comprising a body portion including:
 a fluid inlet and a fluid outlet through which said flow of fluid pass in use, and
 control means for providing a variable restriction on said flow of fluid between said fluid inlet and said fluid outlet located within said body portion between a low flow setting and a high flow setting and for preventing said flow of fluid in an offsetting,
 wherein said control means is able to switch directly between said high flow setting to said offsetting and vice versa, and further is able to switch directly from said low flow sewing to said off setting but is prevented from watching directly from said off setting to said low rate setting.

To those skilled in the art to which the invention relates, may changes in construction and widely differing embodiments and applications of the invention will suggest themselves without departing from the scope of the invention as defined in the appended claims The disclosures and the descriptions herein are purely illustrative and are not intended to be in any sense limiting.

BRIEF DESCRIPTION OF THE DRAWINGS

FIG. 4 is a cross-section of the present invention orthogonal to FIG. 3, FIG. 5 is a perspective view of the valve member according to the present invention, FIG. 6 is an alternative perspective view of the valve member according to the present invention.

DETAILED DESCRIPTION

The present invention attempts to provide a valve which allows more gradual control over the change in gas flow rate in response to the rotational adjustment over that of traditional valves. This will be useful in applications such as gas cook tops where a high level of control is desired, especially at low flow rates. It will be appreciated however that such a valve will be applicable for control of fluid flow generally and is not restricted to gaseous fuels.

A tapered groove on an annular path in the valve member interacts with an inlet port in the valve housing so that as the cross section of the groove varies according to the angular position of the valve member and according to one embodiment of the present invention a linear relationship exists between changes in angular position and changes in the volumetric flow rate of the gas. Also inherent in such a valve is the need to be generically applicable to different types of gas and different sized gas burners especially in the application of gas cook tops. As such the present invention also provides a simple and easy method of appropriately adjusting the flow rate of the gases at the lower setting such that it is easily adapted to a different type of gas or a different sized burner.

General Construction of the Valve

Figure 1:
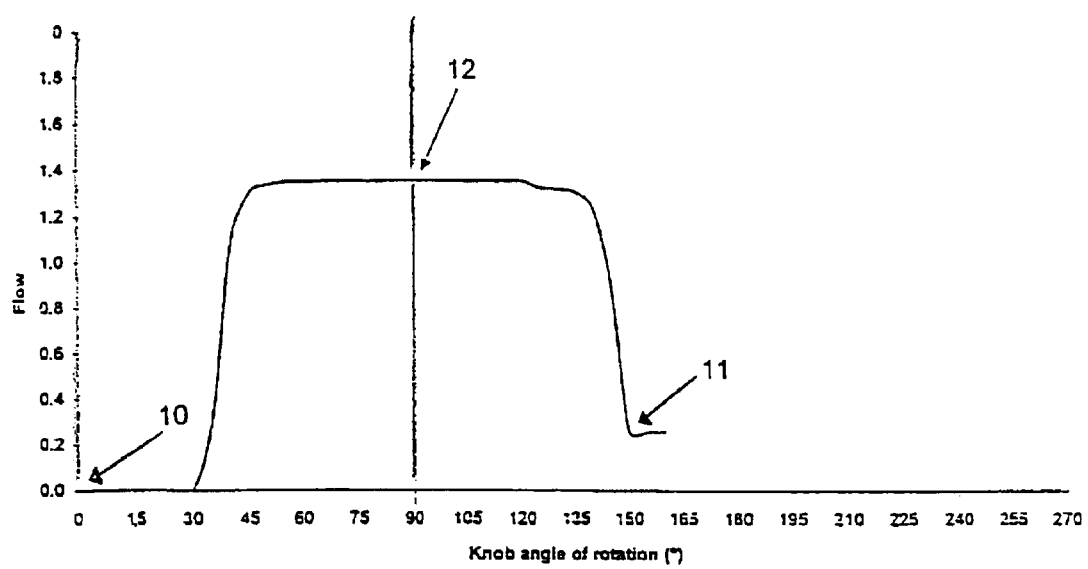
FIG. 1 is a graph of volumetric flow rate versus angular displacement according to a prior art device.
Figure 2:
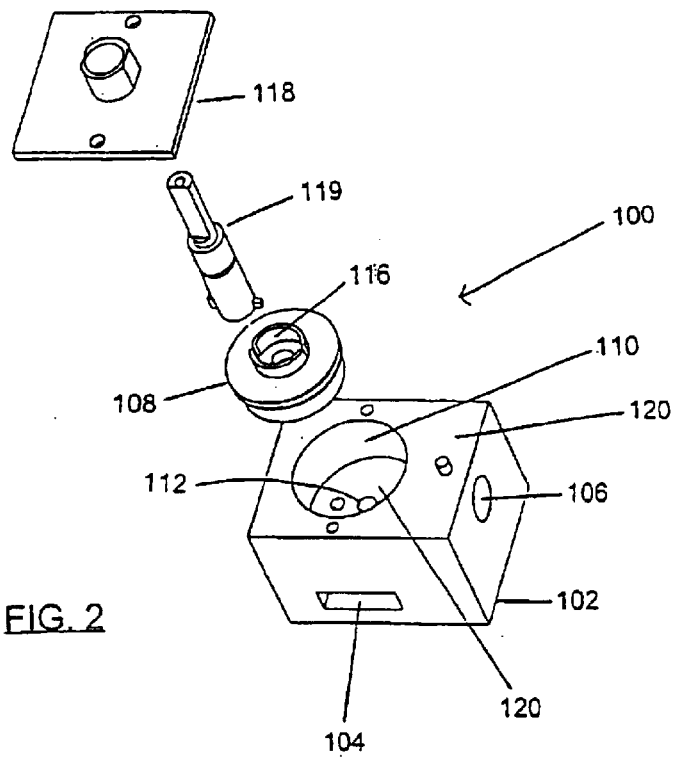
FIG. 2 is an exploded view of the present invention in perspective.

Now referring to FIG. 2, the gas valve 100 according to the present invention, is shown in exploded view. The body portion 102 is shown with a gases inlet 104 extending throughout the body portion 102 to the opposite side and a gases outlet 106 adapted to connect with standard gas fittings. The body portion 102 is constructed from cast aluminium but it will be appreciated that many other materials will be equally applicable. A valve member 108 is designed to interface with the cavity 10 in the interior of the body portion 102, The cavity 110 has a number of ports 112 which match up with various ports and/or grooves in the valve member 108. A shaft 19 is provided to allow external control over the valve member and this slots into a mating cavity 116 atop the valve member 108. To ensure mechanical integrity of the mechanism and to enclose the gas chamber, a top plate 118 is secured to the top surface 120 of the body portion 102. It will be appreciated that the present invention could equally be constructed with the body portion 102 split into two sections about the bottom face 120 of the chamber 110, with the top plate 118 integral with the top section. This would then allow access to the bottom face 120 of the chamber 110 for machining to improve the gas sealing properties with the bottom face 132 of the valve member 108.

Construction of the Valve Member

The valve member shown in more detail in FIGS. 5 to 8 is of a generally cylindrical shape. An annular groove 122 is provided on the periphery to accommodate an annular rubber "O-ring" seal 123 The top side 124 includes a raised cylindrical wall which surrounds the cavity 116 which continues into the interior of the 108. The cylindrical wall 126 is provided with two slots 128 which provide a means for engaging with the shaft 119. The cavity 116 continues through Be interior of the valve member 108 to a protrusion 130 on the bottom face 132.

Also included on the bottom face 132 is a tapered groove which follows an annular path and is terminated with a gases port 136 which communicates with the interior of the valve member 108. Both the gases port 136 and the internal cavity 116 communicate with an outlet passage 138 which continues to the exterior of the valve member 108 on its side face 140. The protrusion 130 on the bottom face 132 also includes a much smaller gases port 142 which is provided for gas flow when the valve is set on its "low setting".

In order to adjust the gas flow at the low setting a rotatable plug 144 is screwed into the cavity 116 in the valve member 108 and effectively by its angular position determines the effective restriction between the small gases port 142 and the main outlet gas passage 138. The shaft 119 has a hollow interior such that a screw driver or other such means can engage with a slot 148 provided on the top surface of the rotatable plug 144 to adjust the flow rate at the "low setting".

It will be appreciated by one skilled in the art that an annular tapered groove provides a number of advantages over prior art systems. It provides particular flexibility in providing a desired control characteristic as well as simple efficient manufacture. Further as the valve member wears over time, the present invention is less likely to suffer from any deterioration in performance. As the valve member wears down over time, it will still seal adequately and to a large extent the groove will always match up with the cavity inlet port therefore ensuring correct operation.

Operation of the Valve

Figure 3:
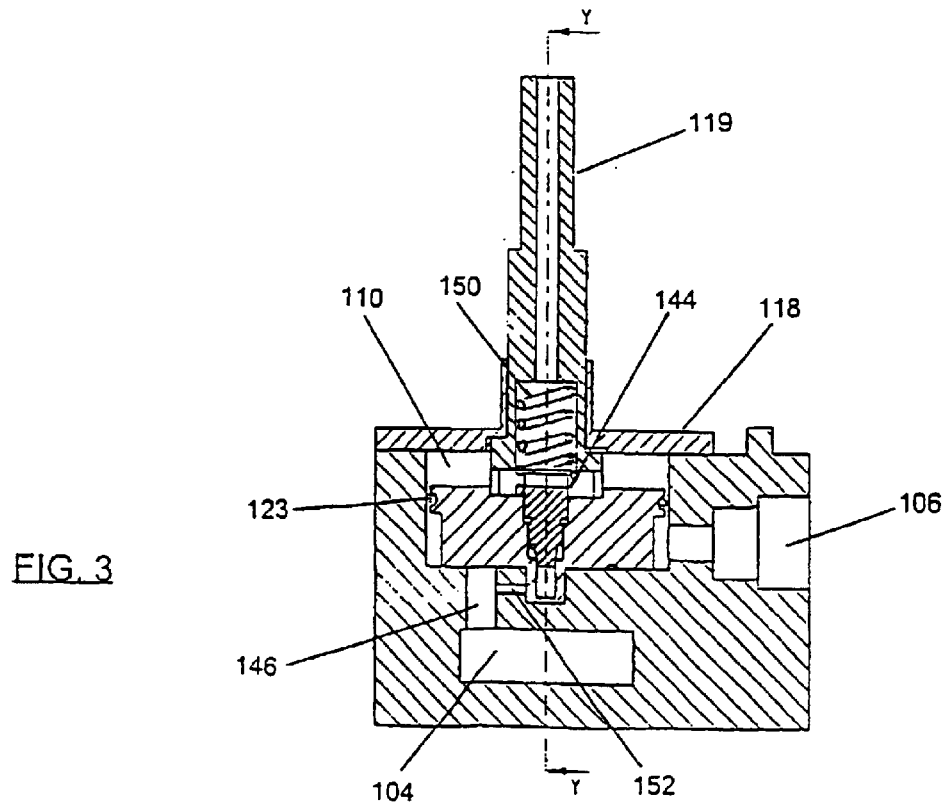
FIG. 3 is a cross-section of the present invention.
Figure 7:
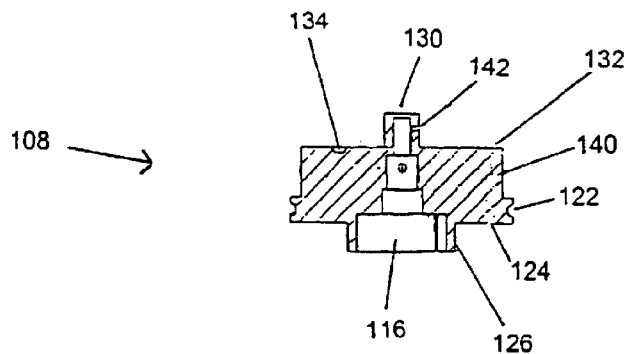
FIG. 7 is a cross-section of the valve member according to the present invention.
Figure 8:
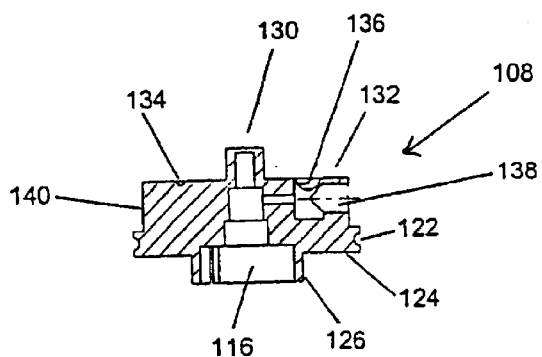
FIG. 8 is an alternative cross section of the valve member orthogonal to FIG. 7.

Referring now to FIGS. 3 and 4, it is seen how in use the various members cooperate. The valve member 108 is forced down upon the bottom face 120 of the chamber 110 in the body portion 102 by a spring 150 which provides an opposing force between the shaft 119 (and therefore the top plate 118) and the valve member 108. This pressure is such that a gas tight seal exists between the bottom surface 132 of the valve member 108 and the bottom face 120 of the chamber 110. The gases flow from the inlet port 104, to the cavity 110, via a cavity inlet port 146. As the valve member 108 rotates the cavity inlet port 146 is varied in cross section due to the variation in width of the tapered groove at the point of intersection. The gas then flows through the remainder of the tapered groove to the gases port 136 at its end through the body of the valve member through to an outlet port 138 wherein it flows around the circumference of the chamber 110 until it meets up with the main gas outlet port 106. The gas is prevented from flowing up any further into the chamber 110 by the "O ring" seal 123.

In the "off setting" the valve member 108 is rotated such that the inlet port 152 does not meet up with the tapered groove at all and is closed off by the flat bottom face 132 of the valve member 108. In the low setting the small gases port 142 in the protrusion 130 on the bottom face 132 of the valve member 108 matches up with a smaller gases inlet port 152 connected to the inlet 104. Meanwhile the main gas inlet port is blocked off and gas is prevented from flowing down the tapered groove. Therefore the only restriction on the gas flow at the low setting is determined by the angular position of the rotatable plug 144. In any other setting other than low or off the gas flow is determined by angular position of the valve member.

Shaft and Body Configuration

Figure 9:
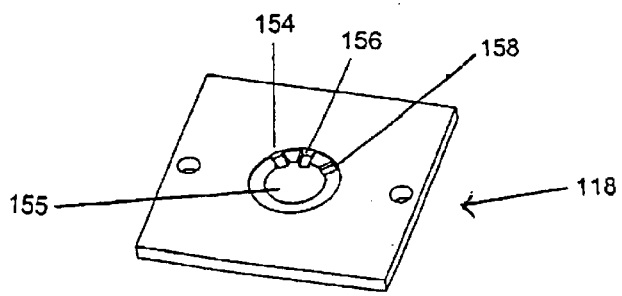
FIG. 9 is a perspective view of the top plate according to the present invention.
Figure 10:
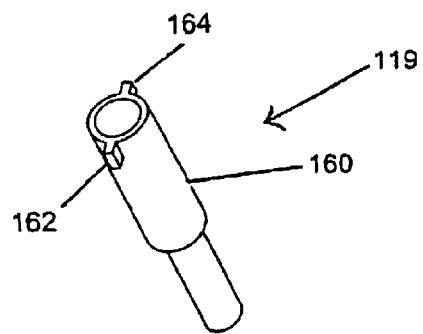
FIG. 10 is a perspective view of the shaft according to the present invention.
Figure 11:
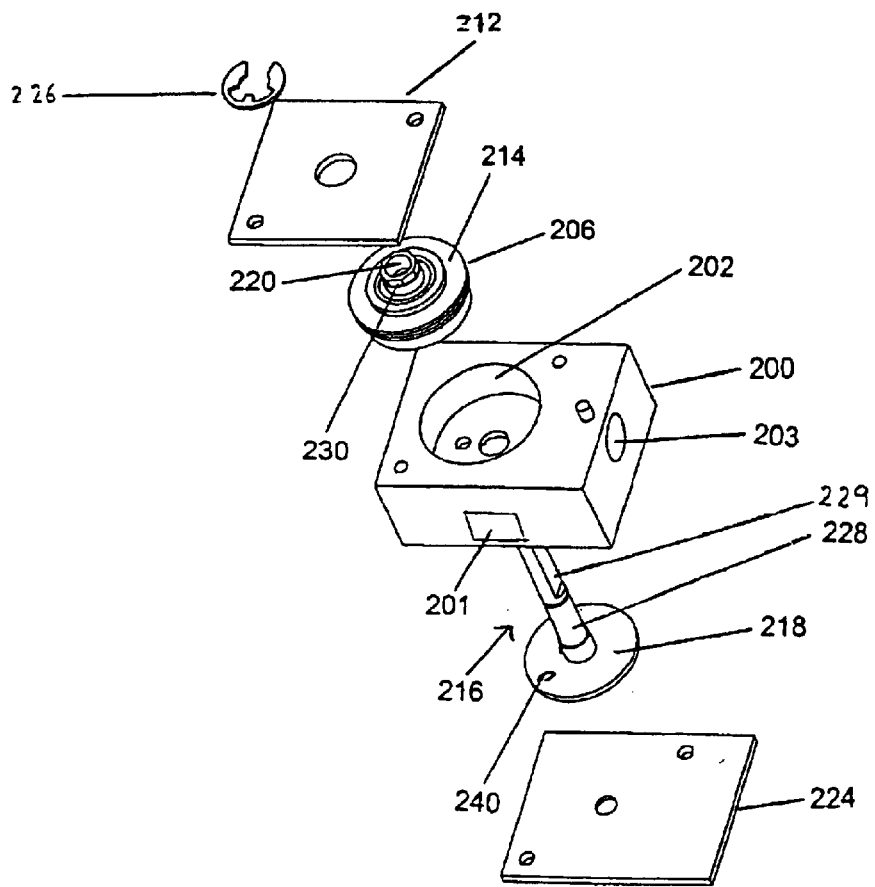
FIG. 11 is an exploded view according to an alternative embodiment of the present invention in perspective.
Figure 12:
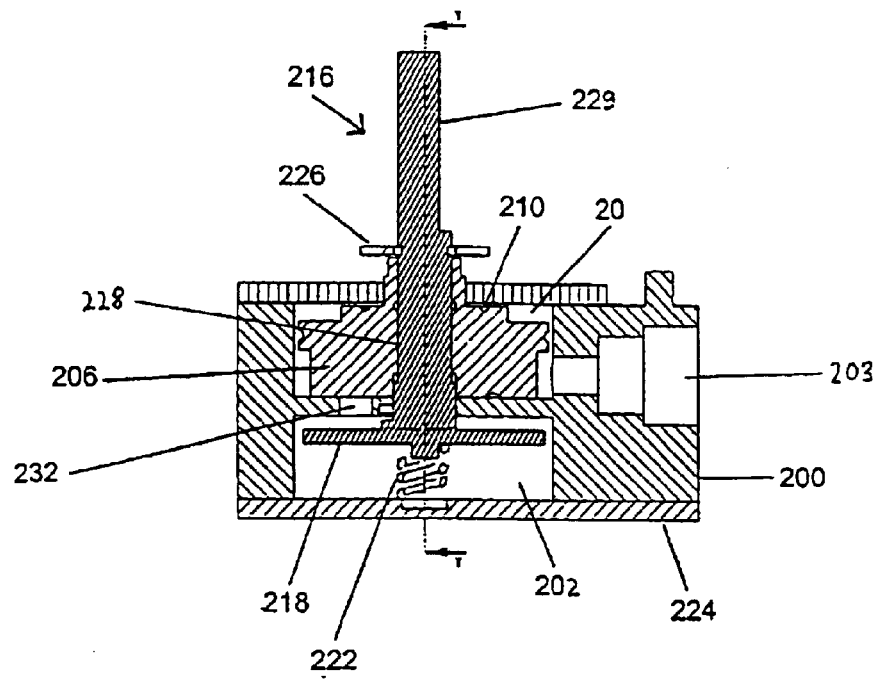
FIG. 12 is a cross-section of an alternative embodiment of the present invention.
Figure 13:
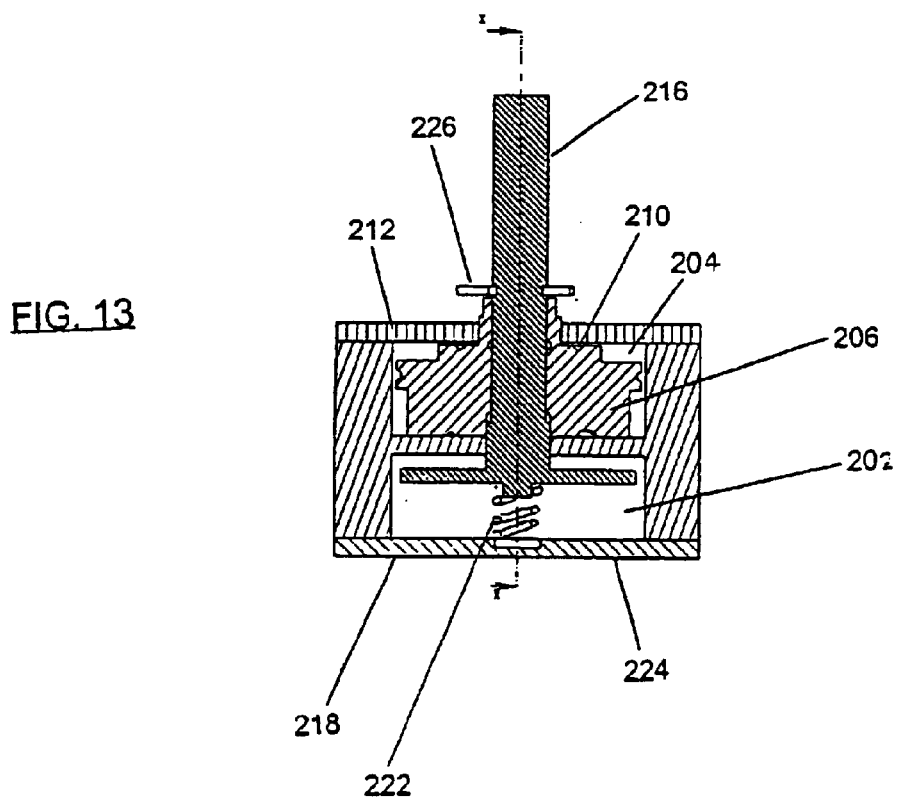
FIG. 13 is a cross-section of an alternative embodiment of the present invention orthogonal to FIG. 12.
Figure 14:
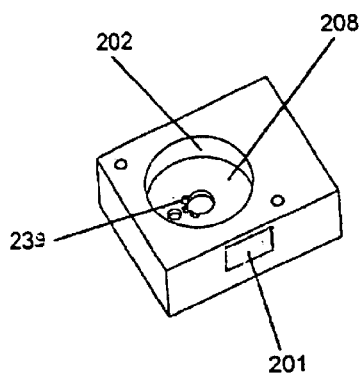
FIG. 14 is a perspective view of the body portion from below according to an alternative embodiment of the present invention.
Figure 15:
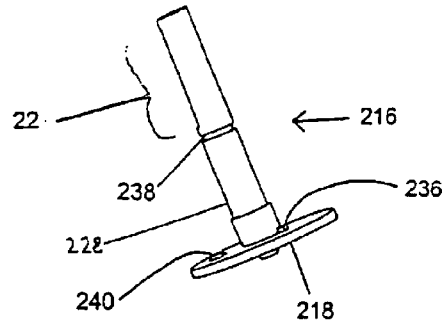
FIG. 15 is a perspective view of the shaft according to an alternative embodiment of the present invention.

Referring now to FIG. 9 and FIG. 10, we can see how the shaft 119 and the top plate 118 interact in the various different settings. In FIG. 9 we see the underside of the top plate 118 which has a circular hole 155 in the centre of the plate with three notches 154, 156, 158 on the edge in close proximity. The notches interact with the larger cam 162 on the base of the exterior of the shaft 119. Due to the action of the spring 150 the shaft 119 must be depressed and rotated in order to move the valve from the out of the "off" notch 156. In the "low setting" the large cam 162 is positioned in the low setting notch 154 and again has to be pushed and rotated to be moved to any other position. Once out of the low setting notch 154 the shaft may be rotated freely from any position between there and the high setting notch 158. It will be appreciated that when the shaft 119 is freely rotated and the large cam 162 then meets one of the grooves then it will snap into place and will stay locked in that position until the shaft is depressed and then rotated. Again as already described the shaft 119 has a hollow body allowing access to the rotatable plug 144 for adjustment of the gas flow at low setting.

To provide a rigid and smooth rotation at the shaft 119, a second smaller cam 166 is located at the bottom of the shaft, diametrically opposite the larger cam 162.

Second Preferred Embodiment

Referring now to FIGS. 11–15 showing a second embodiment of the present invention in which the shaft extends down into an inlet chamber and includes a circular disc which as well as providing the locking action on the off, low and high settings also plays some part in the actual valve action of the mechanism.

The body portion 200 includes a lower chamber 202 and an upper chamber 204. The upper chamber houses a valve member 206 substantially as described in the first embodiment. Instead of a spring the compressive force between the lower face of the valve member 206 and the bottom face 208 of the upper chamber 204 is provided by a rubber O ring seal 210 which provides a reactive force between the upper plate 212 and the upper surface 214 of the valve member 206.

The lower chamber 202 forms part of an inlet manifold, with inlet ports 201 on two opposing side walls at the body portion 200. The outlet port 203 is located on a third side wall at the body portion 200 and, as for the first embodiment is adapted for connection with standard gas fittings.

The operation of the valve is substantially similar to that described previously in the first embodiment The gas flows from the inlet ports 201 into the lower chamber 202 and through the upper chamber inlet port 232 As with the first embodiment, the rotation of the valve member 206 varies the flow of gases, because of the varied cross-section of the tapered annular groove on its base as it intersects with the upper chamber inlet port 232. The gases then flow through the groove up a passage in the valve member 206, into the upper chamber 204 and out through the outlet 203.

The shaft 216 includes a solid circular disc 218 attached at its bottom end. The shaft itself in use cooperates with an axial hole 220 extending the length of the valve member 206. The shaft is permitted to move vertically (to a point) independently of the valve member but moves cooperatively with the valve member in response to any rotational movement The shaft includes a flat section 229 which extends partially along the length of the shaft 216 for attaching a control knob. As was described in the first embodiment in the off, low and high setting the shaft is locked in place and needs to be depressed before it can be rotated. The locking mechanism consists of notches 239 for each setting, in the divider between the two cavities, and a cam 236 at the base of the shaft 216. A spring 222 is provided between the disc 218 at the bottom of the shaft 216 and the bottom plate 224 of the body portion 200 to resist depression of the shaft.

In order to adjust the flow at low setting the circlip 226 must be removed from the shaft 216 so that the alignment of the spline 228 on the shaft 216 and the mating member 228 and the valve member 206 can be adjusted. Practically this will require the locking nut 230 to be loosened so the valve member 206 can be freely rotated with respect to the shaft 216. The actual flow rate at the low setting is dependent on the width of the groove intersecting the upper chamber inlet 232 when the cam 236 a the base of the shaft 216 is locked in the low setting notch. This differs from the first embodiment in that there is no separate flow path for the low setting. A circlip 226 is attached to the shaft 216 on a slot 238 to ensure that it can only be depressed to a certain extent so as not to over-compress the spring 222.

In a variation of this embodiment the cam 236 and notches can be replaced by a protrusion 240 on the upper face on the disc 218. In the off setting the protrusion would fit into die upper chamber inlet port 232, sealing it off. In low and high setting it might rest in dimples in the roof of the lower chamber 202.

Combined Inlet Manifold

As described in the various embodiments, the valve may be constructed with an inlet manifold which runs from one side of the valve to the other. This then allows a common inlet manifold to be formed when the valves are gained together side by side. When used in this configuration, the inlet on one side of the ganged valves is blocked off and the other connected to the gas supply. The individually controlled supply from each valve is then supplied from the respective outlets of each valve. This not only saves on equipment to connect to the gas supply, but it saves on space and for example allows a more compact cook top. The individual valves may be attached side by side or separated using spacers, depending on requirements.

Figure 16:
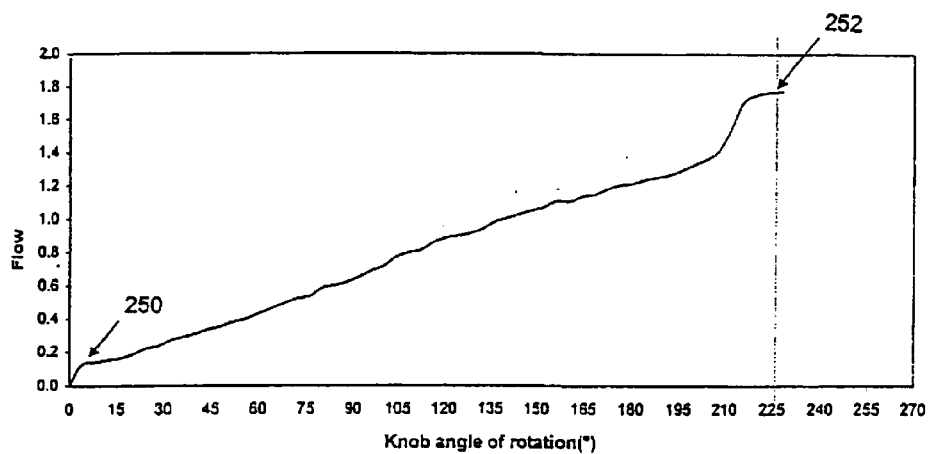
FIG. 16 is a graph of the measured volumetric flow rate versus angular position of the valve member using a prototype of the present invention.
Figure 17:
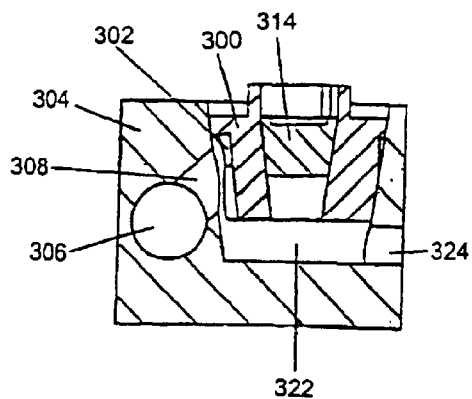
FIG. 17 is a cross-section of the present invention according to the third preferred embodiment.
Figure 18:
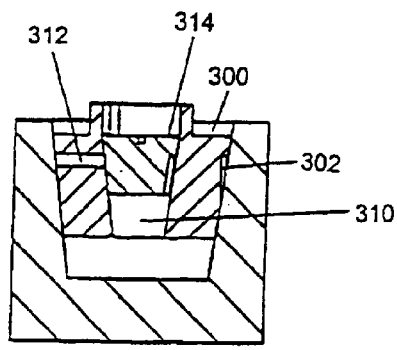
FIG. 18 is a cross-section orthogonal to that of FIG. 17.

The transfer function relating shaft rotation to volumetric flow rate according to the preceding embodiment of the present invention is shown in FIG. 16. This illustrates a substantially linear relationship of volumetric flow rate against shaft rotation, between the low setting 250 and the high setting 252. It will of course be appreciated that variations in how the taper varies will allow the relationship to be tailored to whatever might suit the particular application. In particular a more logarithmic/exponential relationship might be useful, since for cook top applications fine control is usually only required at low flow rates.

Third Preferred Embodiment

It will be appreciated in the foregoing that there are a number of configurations available to achieve the present invention. In a third preferred embodiment shown in FIGS. 17 to 20, the present invention is illustrated including a conical valve member 300. Apart from the shape of the valve member 300, the third preferred embodiment is characterised by the fact that the tapered groove, in this case, is on the side of the valve member. The third embodiment may provide a simple means of controlling a multiple ring gas burner by providing a number of outlet ports in various positions around the body portion 304 of the valve.

Figure 19:
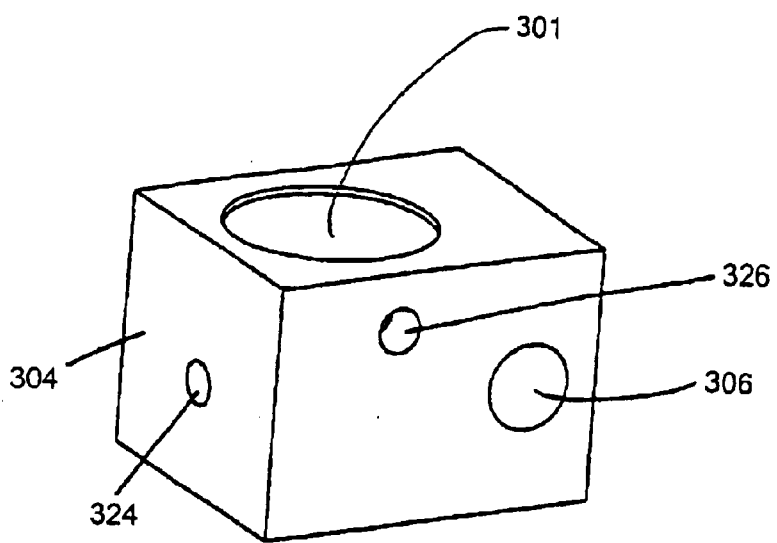
FIG. 19 is a perspective view of the present invention according to the third preferred embodiment.

The valve is generally disposed as depicted in FIG. 19, with a body portion 304 including a main chamber 301, a main inlet port 306, and an outlet port 324.

The gas flows in through the main inlet port 306 which is effectively a cylindrical cavity running from one side of the body portion to the other. In the middle of the main inlet port 306 the gas flows through the chamber inlet port 308 which interfaces with the rotatable valve member 300, itself located within the main chamber. The main cavity 301 is sealed on top with a face plate and rubber seals (not shown).

As mentioned in the preceding embodiment, grooves might be provided on the underside of the face plate so that the valve locks into place in the off, low and high settings. Optionally, farther grooves might be provided such that the entire control range is divided up into discrete steps if so required.

Figure 21:
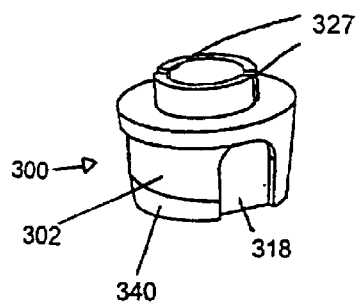
FIG. 21 is a perspective view of the valve member according to the third preferred embodiment of the present invention.
Figure 22:
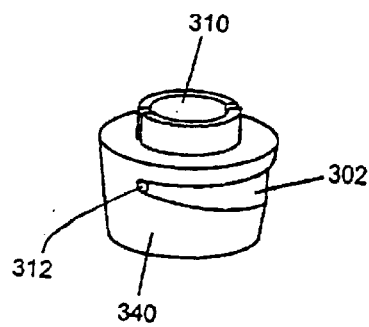
FIG. 22 is an alternative perspective view of the valve member according to the third preferred embodiment of the present invention.
Figure 23:
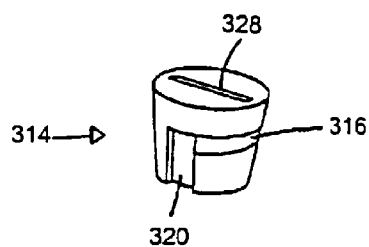
FIG. 23 is a perspective view of the low setting plug according to the third preferred embodiment of the present invention.

The rotatable valve member 300, shown in more detail in FIGS. 21 and 22, is of generally conical shape including a hollow centre section 310. The tapered groove 302 runs radially around the side face 340 of the valve member 300. At the wide end of the tapered groove 302 is an axial channel 318 running downwardly, which when located in the main cavity 301 puts the tapered groove 302 in fluid communication with the space 322 below the valve member 300. At the narrow end of the tapered groove 302 (either in the groove or beside it), a low setting port 312 provides a further gas flow path through to the hollow centre 310. Located in the hollow centre section 310 is a rotatable low setting plug 314 shown in more detail in FIG. 23. Similarly to the valve member 300, the low setting plug 314 includes a tapered groove 316 running radially around the side of is in the preferred form, a conical member. The low setting plug 314 also has a downward axial channel 320 at the wide end of its tapered groove 316.

For the valve member 300 (and the low setting plug 314) the gas flows from the inlet port 308 (312) into the tapered groove 302 (316), radially around to the wide end of the tapered groove to a downward axial channel 318 (320), which communicates with the lower empty portion 322 of the main cavity 301. From here it flows into the main outlet port 324 which is connected to the appropriate burner ring.

Provided on the upper surface of the valve member 300 arc slots 327 which provide a means to engage a shaft (not shown) which allows external control over the valve member and therefore over the gas flow. Similarly, the low setting plug includes a slot 328 which allows the gas flow at low setting to be adjusted in use through the middle of the hollow shaft. It will be appreciated that the only time that gas will flow through the low setting plug 314 is when the valve member 300 is rotated to the low setting position whereby the low setting port 312 matches up with and is in fluid communication with the chamber inlet port 308. Alternatively if the low setting port 312 is actually inside the groove 362 then gas will flow when the valve is in any "on" setting.

Figure 20:
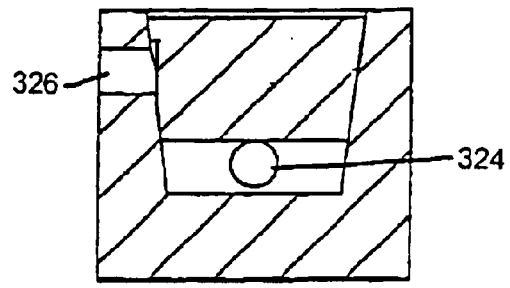
FIG. 20 is an alternative cross-section of the present invention also orthogonal to FIG. 17.

In a further improvement shown in more detail in FIGS. 19 and 20, the third preferred embodiment of the present invention provides a means of controlling multiple ring burners. In order to provide this, the body portion 304 includes at least one additional outlet port 326 he additional outlet port 326 is located somewhat adjacent to the member inlet port 308 such that it also will interface with the tapered groove 302 and therefore will only be in fluid communication therewith for a limited angle of control.

Figure 24:
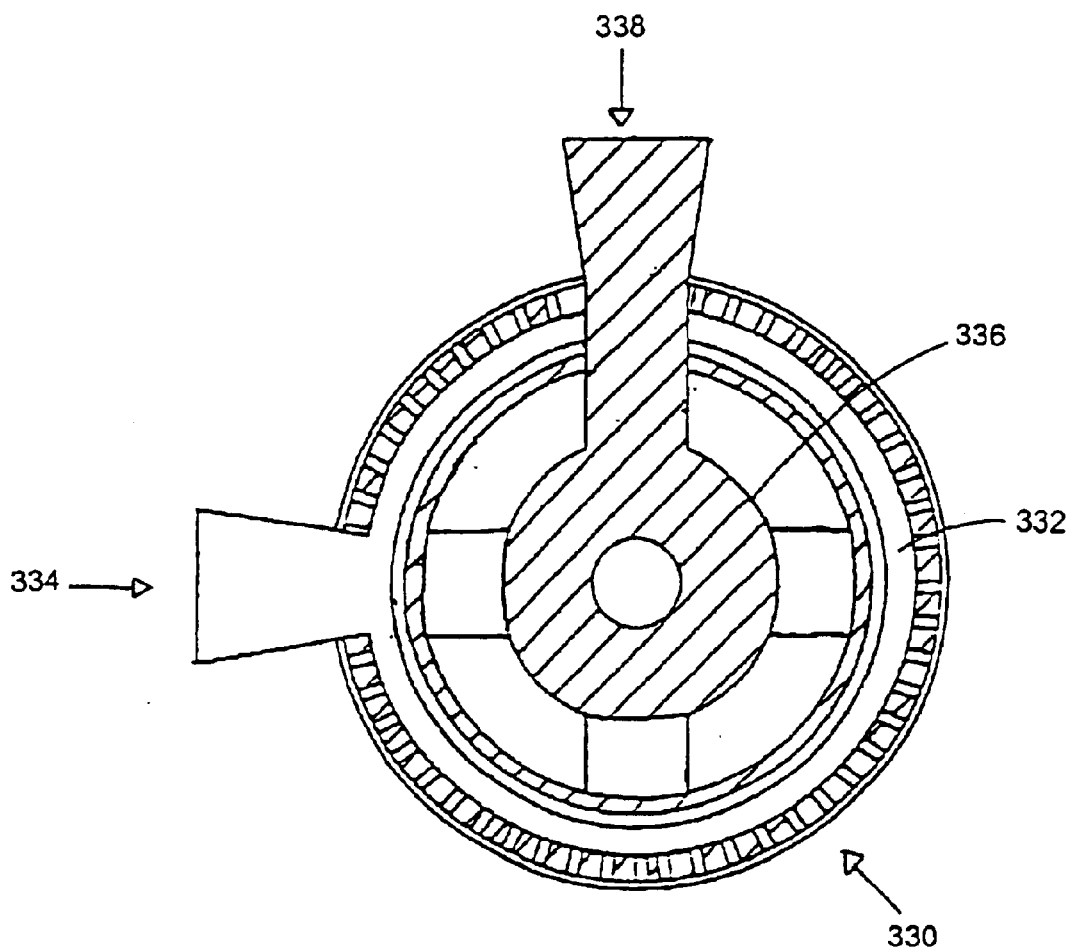
FIG. 24 is a plan view of a multi-ring burner.
Figure 25:
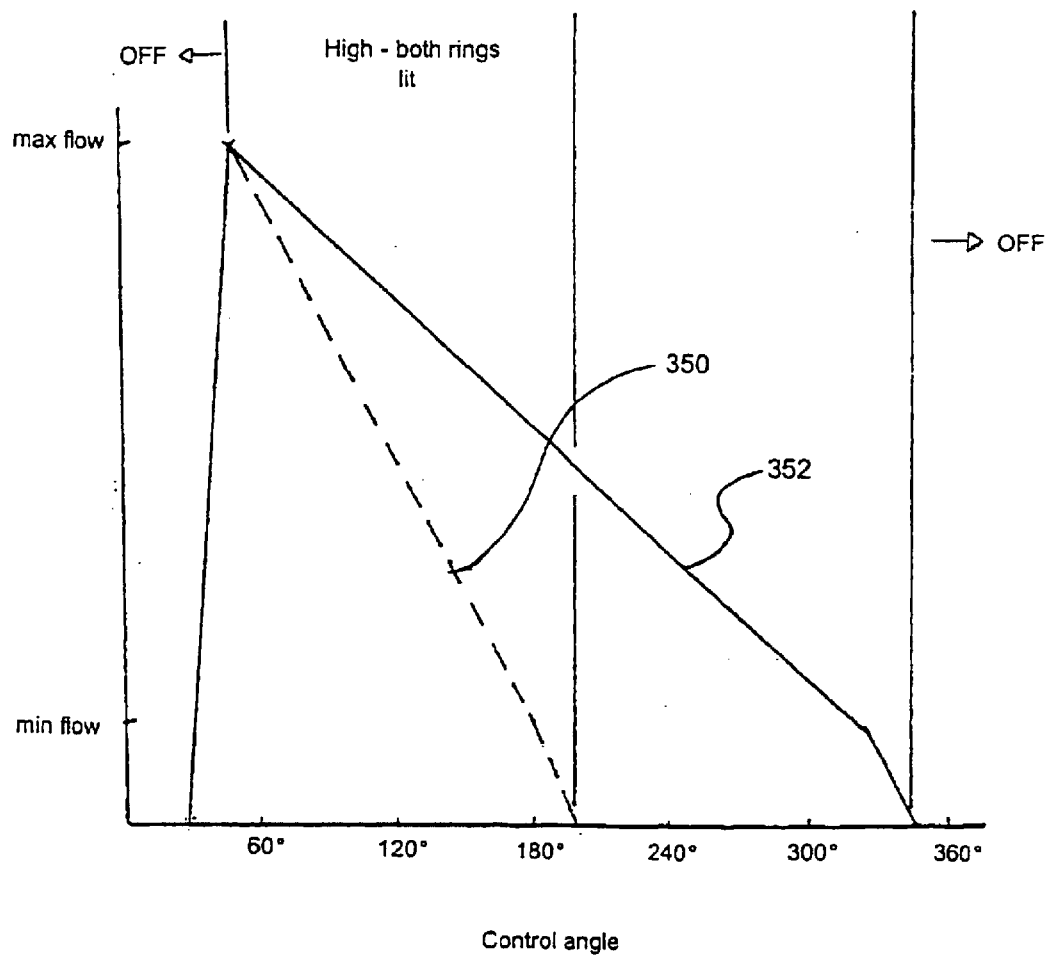
FIG. 25 is a graph showing the flow rate versus control angle characteristic according to the third preferred embodiment of the present invention.

A multiple ring burner 330 such as might be controlled by the preferred embodiment of the present invention is shown in FIG. 24. It includes an outer ring 332 supplied by an outer supply port 334 and an inner burner ring 336 which is supplied by an inner ring port 338. FIG. 25 illustrates the expected control characteristic of the gas supplied to the outer burner ring 350 and the inner burner ring 352 according to the third preferred embodiment. This illustrates that in this form the present invention provides the ability to control the gas burner with a high level of flexibility and sensitivity, especially at the low rates of gas flow where high control is necessary.

Plastic Construction

It will be appreciated that in the previous embodiments the valve might be constructed from aluminium or brass materials as have been traditionally used. The preferred embodiment of at least the valve member is rotatable. At least in one form, the present invention might be constructed using a plastics composition which will provide hard wearing properties, easy and inexpensive manufacturing, and results in a smooth adjustment action. One of the preferred compositions envisaged includes a substantial component of nylon based derivative. It will be appreciated that a number of other plastics compositions will also be suitable to achieve this purpose. When the entire valve constructed from plastics, ganging a number of valves together to form a common inlet manifold such constructions will improve ease of manufacture and reduce manufacturing and raw material costs.

Ratchet Attachment

Figure 27:
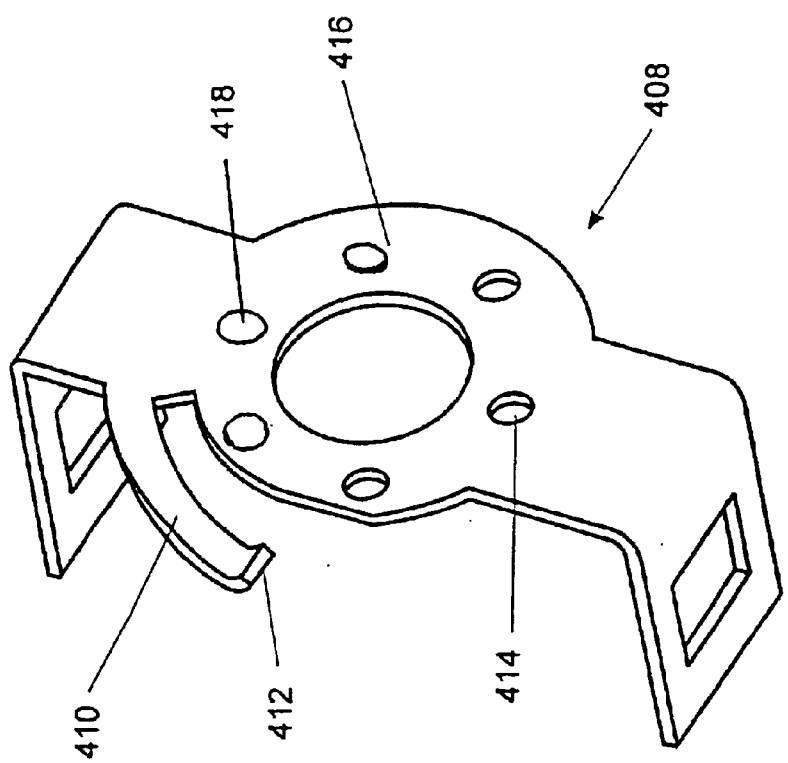
FIG. 27 is a perspective view of the ratchet attachment according to the fourth preferred embodiment of the present invention.
Figure 26:
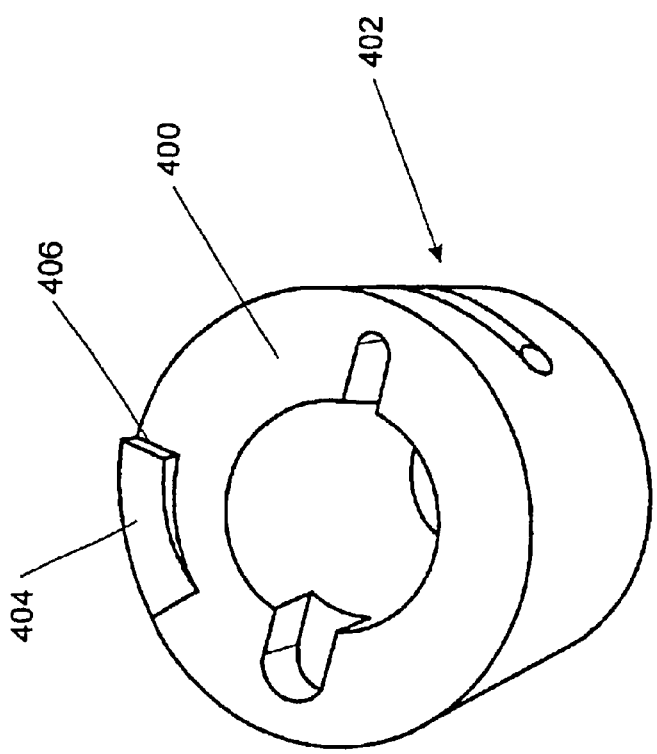
FIG. 26 is a perspective view of the valve member according to a fourth preferred embodiment of the present invention.

Referring now to FIGS. 26 and 27 a fourth preferred embodiment of the present invention is shown which allows generally free rotation of the valve member within the body portion except that a direct movement from the off setting to the low flow rate setting is prevented. In this fashion the present invention allows the valve to be turned off from both the high flow rate and the low flow rate setting, improving the ease of use, while still retaining the safety feature of prevention of switching on the valve straight to the low setting. The top face 400 of the valve member 402 includes a small ramped portion 404 with a flat face 406 at one end. Effectively during rotation in the anti clockwise direction from the low flow rate setting to the off setting and from the off setting to the high flow rate setting the ramped portion 404 will be in front of the flat face 406. In this fashion the ramped portion 404 slides unobstructed underneath the ratchet attachment 408 which is attached over the top of the valve member to the body portion, described in previous embodiments.

The ratchet attachment 408 includes a ratchet leg 410 juxtapositioned within the path of travel of the ramp portion 404 and the flat face 406. Only when the valve member 402 is rotated clockwise and where the flat face 406 meets up with the distal end 412 of the ratchet leg 410 is further rotation prevented.

Further the ratchet attachment 408 includes a number of apertures 414 in its mid section 416. These apertures 414 are provided, as described in the preceding embodiments to allow the gas valve to lock into the off high and low flow settings, preventing them from being dislodged unintentionally.

Further, a number of indentations 418 are provided in an annular path following that of the apertures, to allow stepped rotation of the valve member. The indentations 418 (as well as the apertures), engage with a ridge associated with the control member (not shown). In this fashion the ridge locks into place on high, low and off settings and partially locks into place at the intermediate settings between the high and low setting. This stepped rotation may be desirable in some applications where the user wants to consistently set the airflow rate at a particular setting.

Thus an improved gas valve has been described with a more gradual and controllable variation of the flow rate. It offers flexibility in that the low setting flow rate can be easily adjusted in situ to adapt to different fuels and burners. The valve itself is simple and modular and may be ganged together in series with a number of valves It provides the flexible control over multiple ring burners and in a further improvement may be constructed from plastic. Also to improve ease of use the valve may be turned off in any direction of rotation, but only be turned on to the high setting.

What is claimed is:

1. A valve for controlling a flow of fluid comprising:
    a body portion including a fluid inlet and a fluid outlet through which said flow of fluid pass in use, and
    frusto conical control means for restricting said flow of fluid between said fluid inlet and said fluid outlet located within said body portion and adjustably rotatable therein,
    wherein one of said body portion or the conical surface of said control means includes a tapering groove on an annular path and the other includes a control port, in use said control port intersecting with said annular groove such that the position of said intersection varies according to the angular position of said control means, such that in use there is a gradual variation in the flow rate of said flow of fluid with respect to variations in the angular position of said control means over a substantial angle of rotation of said control means, said intersection being within a flow path between said fluid inlet and said fluid outlet.

2. A valve for controlling a flow of fluid as claimed in claim 1 wherein said flow of fluid is a flow of gaseous fuels.

3. A valve for controlling a flow of fluid as claimed in claims 1 or 2 wherein the flow rate of said flow of fluid is controllable between a low flow rate setting and a high flow rate setting, wherein in use said control means substantially locks in place when adjusted to said lower setting or said high setting, whereby requiring additional applied force to be adjusted therefrom, with respect to that at any other flow rate of said flow of fluid.

4. A valve for controlling a flow of fluid as claimed in any one of claims 1 to 3 wherein the relationship between said gradual variation of the flow rate with respect to said angular position of said control means is substantially linear and said flow rate relates to the volumetric flow rate of said flow of fluid for a constant pressure.

5. A valve for controlling a flow of fluid as claimed in claim 3 further comprising actuation means including a first adjustment means and a second adjustment means operatively connected with said control means, said first adjustment means allowing external adjustment of said angular position of said control means, in use the flow rate of said flow of fluid at said low setting depending the relative position of said second adjustment means to said first adjustment means, said second adjustment means thereby allowing external adjustment of the flow rate of said fluid flow at said low setting.

6. A valve for controlling a flow of fluid as claimed in claim 5 wherein said control means further comprises at least two fluid flow paths, wherein a first fluid flow path primarily conveys said flow of fluid, but is bypassed on said low setting whereby said flow of fluid is conveyed by a second fluid flow path, and said relative position of said second adjustment means with respect to said first adjustment means adjustably restricting the flow rate of said flow of fluid at said low setting.

7. A valve for controlling a flow of fluid as claimed in claim 5 wherein said actuation means includes an extension portion, said extension portion being within a flow path between said fluid inlet and said fluid outlet and wherein in use said control means is adjusted to an off setting, said flow of fluid is blocked by said extension portion.

8. A valve for controlling a flow of fluid as claimed in any one of claims 1 to 7 wherein when said control means is adjusted to said off position said control port and said tapering groove do not intersect.

9. A valve for controlling a flow of fluid as claimed in any one of claims 1 to 8 wherein said annular groove is semicircular in cross-section.

10. A valve for controlling a flow of fluid as claimed in any one of claims 1 to 8 wherein said annular groove is triangular in cross-section.

11. A valve for controlling a flow of fluid comprising:
    a body portion including a fluid inlet and a fluid outlet through which said flow of fluid pass in use, and
    control means for restricting said flow of fluid between said fluid inlet and said fluid outlet located within said body portion and adjustably rotatable therein,
    wherein one of said body portion or said control means includes a tapering groove on an annular path and the other includes at least two control ports being physically separated, in use each of said control ports intersecting with said annular groove such that the position of said intersections varies according to the angular position of said control means, such that in use there is a gradual variation in the flow rate of said flow of fluid through each of said control ports with respect to variations in the angular position of said control means over a substantial angle of rotation of said control means, said intersections being within a flow path between said fluid inlet and said fluid outlet, and for a given angular position of said control means the flow rate through a first of said control ports will differ from that through a second of said control ports, said first control port being in fluid communication with a first fluid:, outlet and said second control port being in fluid communication with a second fluid outlet.

12. A valve for controlling a flow of fluid as claimed in claim 11 wherein said first control port and said second control port being on said angular path, and being separated by a predetermined angular distance.

13. A valve for controlling a flow of fluid as claimed in claim 11 wherein there being a second tapering groove, said first control port being in the angular path of and thereby intersecting with said first annular groove and said second control port being in the annular path of and thereby intersecting with said second annular groove.

14. A valve for controlling a flow of fluid comprising:

a body portion including a fluid inlet and a fluid outlet through which said flow of fluid pass in use, and control means for restricting said flow of fluid between said fluid inlet and said fluid outlet located within said body portion and adjustably rotatable therein, wherein one of said body portion or said control means includes a tapering groove on an annular path and the other includes a control port, in use said control port intersecting with said annular groove such that the position of said intersection varies according to the angular position of said control means, such that in use there is a gradual variation in the flow rate of said flow of fluid with respect to variations in the angular position of said control means over a substantial angle of rotation of said control means, said intersection being within a flow path between said fluid inlet and said fluid outlet, the flow rate of said flow of fluid being controllable between a low flow rate setting and a high flow rate setting, and said control means able to be adjusted into a definite number of intermediate settings between said low setting and said high setting, said control means being partially locked in place in each said intermediate setting whereby a significant force must be applied to said control means to dislodge it from one setting to another.

15. A valve for controlling a flow of fluid as claimed in claim 14 further comprising actuation means operatively connected to said control means, thereby allowing external adjustment of said angular position of said control means, said actuation means engaging with said body portion, said engagement being such that said control means may be partially locked in place in said intermediate settings.

16. A valve for controlling a flow of fluid as claimed in claim 15 wherein said engagement comprises a ridge or petruburance on said actuation means engaging with in plurality of indentations or notches in said body portion, whereby shifting said ridge from one said notch to another requires a significant rotational force to be applied to said actuation means.

17. A valve for controlling a flow of fluid as claimed in any one of claims 1 to 16 wherein said inlet including a fluid inlet manifold having ports on at least two outer faces of said valve, wherein said body portion and said inlet manifold are adapted such that in use when a number of said valves are ganged together their respective ports interconnect to form a common fluid inlet, in use terminated at one end and supplied with fluid at the other.

18. A valve for controlling a flow of fluid comprising a body portion including:

a fluid inlet and a fluid outlet through which said flow of fluid pass in use, and control means for providing a variable restriction on said flow of fluid between said fluid inlet and said fluid outlet located within said body portion between a low flow setting and a high flow setting and for preventing said flow of fluid in an off setting, wherein said control means is prevented from switching directly from said off setting to said low flow setting, or any setting other than said high flow setting.

19. A valve for controlling a flow of fluid as claimed in claim 18 wherein said control means further comprises a protrusion on one face thereof, said protrusion having and angled face portion and a flat face potion, and said body portion further comprising a ratchet means whereby the cooperation of said ratchet means and said protrusion allowing rotation generally in one direction coinciding with the switching from said low rate setting to said off setting and from said off setting to said high flow setting, and to partially allow rotation in the opposite direction coinciding with switching from said high flow setting to said off setting but preventing further rotation where said ratchet means engages with said flat face to thereby prevent switching directly from said off setting to said low flow setting.

* * * * *

UNITED STATES PATENT AND TRADEMARK OFFICE
CERTIFICATE OF CORRECTION

PATENT NO. : 6,726,175 B1
DATED : April 27, 2004
INVENTOR(S) : Taraz' U'Llah Saba, Maria May Brenmuhl and Simon Denzil Brown It is certified that error appears in the above-identified patent and that said Letters Patent is hereby corrected as shown below:

Column 1,
Line 28, "Rinhai Co." should be -- Rinnai Co. --

Column 2,
Line 47, "watching" should be -- switching --

Column 4,
Line 21, "cavity 10" should be -- cavity 110 --
Line 24, "shaft 19" should be -- shaft 119 --
Line 46, "Be interior" should be -- the interior --

Column 8,
Line 20, "362" should be -- 302 --
Line 25, "326 he" should be -- 326. The --

Column 10,
Lines 7-8, "any one of the claims 1 to 3" should be -- claim 1 --
Lines 39-40, "any one of the claims 1 to 7" should be -- claim 1 --
Lines 43-44, " any one of the claims 1 to 8" should be -- claim 1 --
Line 47, "any one of claims 1 to 8" should be -- claim 1 --

Column 11,
Line 5, "fluid:, outlet" should be -- fluid outlet --

Column 12,
Line 11, "1 to 16" should be -- 1, 11 and 14 --

Signed and Sealed this

Sixth Day of July, 2004

JON W. DUDAS
*Acting Director of the United States Patent and Trademark Office*